United States Patent
Yu et al.

(10) Patent No.: US 11,941,087 B2
(45) Date of Patent: Mar. 26, 2024

(54) UNBALANCED SAMPLE DATA PREPROCESSING METHOD AND DEVICE, AND COMPUTER DEVICE

(71) Applicant: Ping An Technology (Shenzhen) Co., Ltd., Guangdong (CN)

(72) Inventors: Xiuming Yu, Guangdong (CN); Wei Wang, Guangdong (CN); Jing Xiao, Guangdong (CN)

(73) Assignee: Ping An Technology (Shenzhen) Co., Ltd., Guangdong (CN)

( * ) Notice: Subject to any disclaimer, the term of this patent is extended or adjusted under 35 U.S.C. 154(b) by 607 days.

(21) Appl. No.: 17/165,640

(22) Filed: Feb. 2, 2021

(65) Prior Publication Data

US 2021/0158078 A1 May 27, 2021

Related U.S. Application Data

(63) Continuation of application No. PCT/CN2018/123208, filed on Dec. 24, 2018.

(30) Foreign Application Priority Data

Sep. 3, 2018 (CN) .......................... 201811018913.0

(51) Int. Cl.
*G06F 16/00* (2019.01)
*G06F 7/24* (2006.01)
(Continued)

(52) U.S. Cl.
CPC .......... *G06F 18/24137* (2023.01); *G06F 7/24* (2013.01); *G06F 18/213* (2023.01);
(Continued)

(58) Field of Classification Search
None
See application file for complete search history.

(56) References Cited

U.S. PATENT DOCUMENTS 8,671,069 B2 * 3/2014 Chang .................... G06F 16/68
706/45
2007/0294223 A1 12/2007 Gabrilovich et al.
(Continued)

FOREIGN PATENT DOCUMENTS

CN 101799748 A 8/2010
CN 105786970 A 7/2016
(Continued)

OTHER PUBLICATIONS

Lui et al., article entitled "Improved Decision Tree Method for Imbalanced Data Sets in Digital Forensics", IEEE (Year: 2012).*
(Continued)

*Primary Examiner* — Jean M Corrielus
(74) *Attorney, Agent, or Firm* — IP Spring

(57) ABSTRACT

Provided is an unbalanced sample data preprocessing method, which includes: a data acquisition request is received and initial data is acquired according to the data acquisition request, and the initial data is classified according to a preset classification rule to obtain first-class sample sets and second-class sample sets; characteristics of K first sample points extracted are analyzed to obtain a new data characteristic of the first-class sample sets; a new data label of the first-class sample sets is generated according to a first label corresponding to the first-class sample sets; a ratio between the number of first-class sample sets and the number of second-class sample sets is calculated; and new data of the first-class sample sets is generated according to the new data characteristic and the new data label, and the amount of new data is adjusted according to the ratio to increase the number of first-class sample sets.

15 Claims, 3 Drawing Sheets

(51) Int. Cl.
   *G06F 18/213* (2023.01)
   *G06F 18/214* (2023.01)
   *G06F 18/22* (2023.01)
   *G06F 18/2413* (2023.01)
   *G06F 18/2431* (2023.01)

(52) U.S. Cl.
   CPC ............ *G06F 18/214* (2023.01); *G06F 18/22* (2023.01); *G06F 18/2431* (2023.01)

(56) References Cited

U.S. PATENT DOCUMENTS

| | | | | |
|---|---|---|---|---|
| 2012/0089552 | A1* | 4/2012 | Chang | G06F 16/68 706/52 |
| 2019/0156198 | A1* | 5/2019 | Mars | G06Q 40/02 |

FOREIGN PATENT DOCUMENTS

| | | | | | |
|---|---|---|---|---|---|
| CN | 106599913 | A | * | 4/2017 | |
| CN | 106599913 | A |   | 4/2017 | |
| CN | 106650780 | A | * | 5/2017 | .......... G06F 18/2115 |
| CN | 107688831 | A | * | 2/2018 | ........... G06K 9/6218 |
| CN | 107992905 | A |   | 5/2018 | |
| CN | 108388924 | A | * | 8/2018 | .......... G06K 9/6267 |
| CN | 108460421 | A | * | 8/2018 | |
| JP | 2010-204966 | A |   | 9/2010 | |
| JP | 2018-106216 | A |   | 7/2018 | |
| WO | WO-2017148266 | A1 | * | 9/2017 | .............. G06F 17/11 |

OTHER PUBLICATIONS

Pouyanfar et al., article entitled "Dynamic Sampling in Convolutional Neural Networks for Imbalanced Data Classification", IEEE (Year: 2018).*

Wang et al., article entled "Review of Classification Methods on Unbalanced Data Sets", IEEE (Year: 2021).*

Ozturk et al., article entitled "HSDD: a hybrid sampling strategy for class imbalance in defect prediction data sets", IEEE (Year: 2016).*

Del Rio et al., article entitled "Analysis of Data Preprocessing Increasing the Oversampling Ratio for Extremely Imbalanced Big Data Classification", IEEE (Year: 2015).*

JPO, Notice of Reasons for Refusal for corresponding Japanese Patent Application No. JP2021-506496, dated Feb. 22, 2022, 6 pages.

CNIPA, International Search Report for International Patent Application No. PCT/US2018/123208, 4 pages, dated Jun. 4, 2019.

* cited by examiner

UNBALANCED SAMPLE DATA PREPROCESSING METHOD AND DEVICE, AND COMPUTER DEVICE

CROSS-REFERENCE TO RELATED APPLICATIONS

The application is a continuation under 35 U.S.C. § 120 of PCT Application No. PCT/CN2018/123208 filed on Dec. 24, 2018, which claims priority under 35 U.S.C. § 119(a) and/or PCT Article 8 to Chinese Patent Application No. 201811018913.0 filed on Sep. 3, 2018, the disclosures of which are hereby incorporated by reference in their entireties.

TECHNICAL FIELD

The application relates to an unbalanced sample data preprocessing method and device, a computer device, and a storage medium.

BACKGROUND

With the development of computer technology and social informationization, it is necessary to process massive data in practical production and application, and most of the original data obtained belong to unbalanced data, that is, in the whole data set sample space, there is a huge difference in the number of samples of one type and the rest or several types.

At present, in the case of sample imbalance, that is, when there is a large difference in the amount of data corresponding to two types of labels, for the dataset with a small sample size, oversampling is usually used to balance the sample. The traditional oversampling algorithm, for example, the SMOTE algorithm, gives new data between (0, 1) according to $X\_new = X + rand(0, 1) * (X\_mean - X)$.

However, the new data generated by the current traditional processing method with sample imbalance cannot meet the actual data standards, and there is still a problem of sample imbalance.

SUMMARY

According to various embodiments disclosed in the application, an unbalanced sample data preprocessing method, a computer device, and a storage medium are provided.

An unbalanced sample data preprocessing method includes the following.

A data acquisition request is received, and initial data is acquired according to the data acquisition request.

The initial data is classified according to a preset classification rule to obtain first-class sample sets and second-class sample sets, the number of samples in each of the first-class sample sets being less than a data amount threshold, and the number of samples in each of the second-class sample sets being greater than the data amount threshold.

K first sample points in the first-class sample sets are extracted.

Characteristics of the K first sample points are analyzed to obtain a new data characteristic of the first-class sample sets.

A first-class label corresponding to the first-class sample sets is obtained, and a new data label of the first-class sample sets is generated according to the first-class label.

The number of first-class sample sets and the number of second-class sample sets are respectively obtained, and a ratio between the number of first-class sample sets and the number of second-class sample sets is calculated.

New data of the first-class sample sets is generated according to the new data characteristic and the new data label, and the amount of new data is adjusted according to the ratio to increase the number of first-class sample sets.

A computer device includes a memory and one or more processors. The memory stores a computer readable instruction. The computer readable instruction, when executed by one or more processors, causes the one or more processors to perform the following steps.

A data acquisition request is received, and initial data is acquired according to the data acquisition request.

The initial data is classified according to a preset classification rule to obtain first-class sample sets and second-class sample sets, the number of samples in each of the first-class sample sets being less than a data amount threshold, and the number of samples in each of the second-class sample sets being greater than the data amount threshold.

K first sample points in the first-class sample sets are extracted.

Characteristics of the K first sample points are analyzed to obtain a new data characteristic of the first-class sample sets.

A first-class label corresponding to the first-class sample sets is obtained, and a new data label of the first-class sample sets is generated according to the first-class label.

The number of first-class sample sets and the number of second-class sample sets are respectively obtained, and a ratio between the number of first-class sample sets and the number of second-class sample sets is calculated.

New data of the first-class sample sets is generated according to the new data characteristic and the new data label, and the amount of new data is adjusted according to the ratio to increase the number of first-class sample sets.

One or more non-transitory computer readable storage media storing a computer readable instruction are provided. The computer readable instruction, when executed by one or more processors, causes the one or more processors to perform the following steps.

A data acquisition request is received, and initial data is acquired according to the data acquisition request.

The initial data is classified according to a preset classification rule to obtain first-class sample sets and second-class sample sets, the number of samples in each of the first-class sample sets being less than a data amount threshold, and the number of samples in each of the second-class sample sets being greater than the data amount threshold.

K first sample points in the first-class sample sets are extracted.

Characteristics of the K first sample points are analyzed to obtain a new data characteristic of the first-class sample sets.

A first-class label corresponding to the first-class sample sets is obtained, and a new data label of the first-class sample sets is generated according to the first-class label.

The number of first-class sample sets and the number of second-class sample sets are respectively obtained, and a ratio between the number of first-class sample sets and the number of second-class sample sets is calculated.

New data of the first-class sample sets is generated according to the new data characteristic and the new data label, and the amount of new data is adjusted according to the ratio to increase the number of first-class sample sets.

Details of one or more embodiments of the application are presented in the drawings and descriptions below. Other features and advantages of the application will become apparent in the description, the drawings and the claims.

BRIEF DESCRIPTION OF THE DRAWINGS

In order to more clearly illustrate technical solutions in embodiments of the application, the accompanying drawings needed in the embodiments are simply introduced below. It is apparent for the person of ordinary skill in the art that the accompanying drawings in the following description are only some embodiments of the application, and some other accompanying drawings can also be obtained according to these on the premise of not contributing creative effort.

DETAILED DESCRIPTION

In order to make the technical solutions and advantages of the application clearer, the application will further be described below in combination with the drawings and embodiments in detail. It should be understood that the specific embodiments described here are only used to explain the application and are not intended to limit the application.

Figure 1:
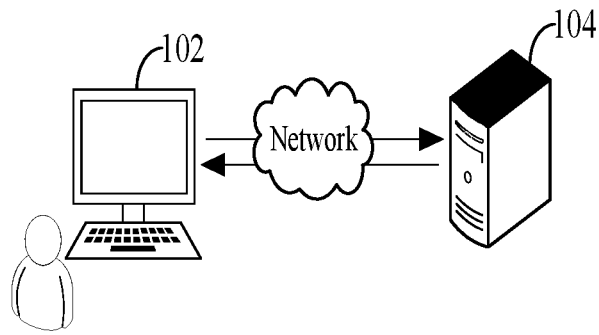
FIG. 1 is a schematic diagram of an application scenario of an unbalanced sample data preprocessing method according to one or more embodiments.

An unbalanced sample data preprocessing method provided by the application may be applied in the application environment as shown in FIG. 1. A terminal 102 communicates with a server 104 through a network. The server 104 receives a data acquisition request sent by the terminal 102, and acquires initial data according to the data acquisition request. The initial data is classified according to a preset classification rule to obtain first-class sample sets and second-class sample sets. The number of samples in each of the first-class sample sets is less than a data amount threshold, and the number of samples in each of the second-class sample sets is greater than the data amount threshold. K first sample points in the first-class sample sets are extracted, and characteristics of K first sample points are analyzed to obtain a new data characteristic of the first-class sample sets. A first-class label corresponding to the first-class sample sets is obtained, and a new data label of the first-class sample sets is generated according to the first-class label. The number of first-class sample sets and the number of second-class sample sets are respectively obtained, and a ratio between the number of first-class sample sets and the number of second-class sample sets is calculated. New data of the first-class sample sets is generated according to the new data characteristic and the new data label, and the amount of new data is adjusted according to the ratio to increase the number of first-class sample sets. The terminal 102 may be, but not limited to, a personal computer, a laptop, a smart phone, a tablet computer and a portable wearable device. The server 104 may be realized by an independent server or a cluster of multiple servers.

Figure 2:
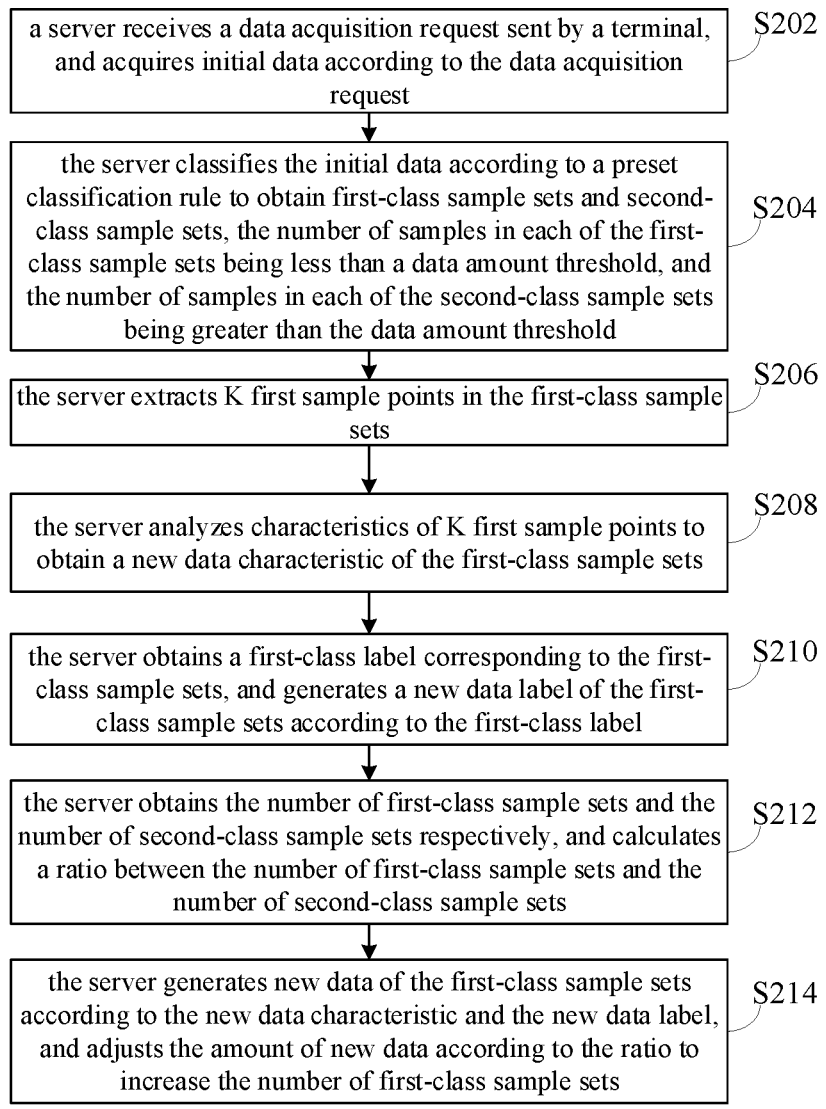
FIG. 2 is a flowchart of an unbalanced sample data preprocessing method according to one or more embodiments.

In one of the embodiments, as shown in FIG. 2, an unbalanced sample data preprocessing method is provided. Illustrated by the application of the method to the server in FIG. 1, the method includes the following steps.

At S202, a server receives a data acquisition request sent by a terminal, and acquires initial data according to the data acquisition request.

Specifically, different data acquisition requests correspond to different initial data, and the server may acquire the initial data corresponding to the data acquisition request sent by the terminal according to a preset corresponding relationship between the data acquisition request and the initial data. The data acquisition request carries a data identity. The server may acquire the initial data corresponding to the data identity according to the corresponding relationship between the data identity and the initial data.

Taking a modeling stage for example, the terminal is required to acquire a mass of sample data to build a model. The server receives a modeling data acquisition request sent by the terminal and extracts a modeling data identity carried in the modeling data acquisition request, obtains a preset corresponding relationship between the modeling data identity and the initial data, and acquires the initial data corresponding to the modeling data identity.

The server acquires original data from a database according to the data acquisition request, and obtains data types corresponding to the original data. A preset corresponding relationship between the data types and processing modes is obtained, and the original data corresponding to each data type is processed to obtain the original data.

At S204, the server classifies the initial data according to a preset classification rule to obtain first-class sample sets and second-class sample sets, with the number of samples in each of the first-class sample sets being less than a data amount threshold, and with the number of samples in each of the second-class sample sets being greater than the data amount threshold.

Specifically, the preset classification rule is a rule that the initial data is classified according to a data amount threshold. The server classifies the initial data with fewer samples than the data amount threshold into the first-class sample sets, and classifies the initial data with more samples than the data amount threshold into the second-class sample sets.

Taking a modeling stage for example, most of the available initial data belong to unbalanced data, that is, in the whole data set sample space, there is a huge difference in the number of samples of one type and the rest or several types. In the embodiment, the server may classify the obtained initial data according to a preset data amount threshold to obtain the first-class sample sets, that is, the initial data with fewer samples than the data amount threshold. The server may also classify the initial data with more samples than the data amount threshold to obtain the second-class sample sets.

The first-class sample set includes multiple first-class samples, there are multiple first sample points in the first-class sample, and the number of first-class samples is less than the preset data amount threshold. So, the first-class sample set may also be called few-class sample set, its corresponding sample may also be called few-class sample, and the first sample point may also be called few-class sample point. The second-class sample set includes multiple second-class samples. There are multiple second sample points in the second-class sample, and the number of second-class samples is greater than the preset data amount threshold. So, the second-class sample set may also be called many-class sample set, its corresponding sample may also be called many-class sample, and the second sample point may also be called many-class sample point.

At S206, the server extracts K first sample points in the first-class sample sets.

Specifically, the first-class sample set includes multiple first-class samples, and the first-class sample includes multiple first sample points. The server extracts a sample set from the first-class sample sets randomly to obtain a first sample set. The distances from all the first sample points in the first sample set to each sample point in the other sample sets of the first first-class sample sets are calculated respectively, and the first sample points are sorted according to the distances to obtain the first K first sample points.

The server respectively calculates the Euclidean distances from all the first sample points in the first sample set to each sample point in the first-class sample sets, sorts the Euclidean distances in order from small to large, and obtains the first sample points corresponding to the first K Euclidean distances according to the sorting of the Euclidean distances.

The Euclidean distance is the true distance between two points in an m-dimensional space, or the natural length of a vector, that is, the distance from that point to the origin. The Euclidean distance in a two-dimensional space and a three-dimensional space is the actual distance between two points. The Euclidean distances calculated are sorted in order from small to large, and the first sample points corresponding to the first K Euclidean distances are obtained, that is, the obtained first sample points are the sample points corresponding to the first K minimum Euclidean distances.

At S208, the server analyzes characteristics of K first sample points to obtain a new data characteristic of the first-class sample sets.

Specifically, the server extracts the characteristics of K first sample points and analyzes the characteristics to obtain a characteristic attribute. The characteristics of the K first sample points are respectively extracted according to the characteristic attribute, and common characteristics of the K first sample points are respectively obtained. Corresponding common characteristic combinations are formed according to the common characteristics, the number of common characteristics included in the common characteristic combinations is calculated, and the common characteristic combinations are sorted according to the number of common characteristics to obtain a common characteristic combination corresponding to the maximum number. The new data characteristic is generated according to the common characteristic combination corresponding to the maximum number. The characteristic attribute refers to the attributes of characteristic about the first sample point, including the category of the characteristic and the definition of the characteristic, obtained after the characteristic of the first sample point is analyzed and processed. Characteristic extraction refers to using a computer to extract image information to determine whether points each image belong to an image characteristic.

The server forms the corresponding common characteristic combination according to the obtained common characteristics. The number of common characteristics included in the different common characteristic combinations is calculated, and the common characteristic combinations are sorted according to the calculated number of common characteristics to obtain a common characteristic combination corresponding to the maximum number. For example, if the number of common characteristics included in the different common characteristic combinations is 4, 5, 3, 6 and 2, and the number of common characteristics obtained after sorting is 6, 5, 4, 3 and 2, then the obtained common characteristic combination corresponding to the maximum number is the common characteristic combination corresponding to the number of common characteristics 6. The server obtains the calculated common characteristic combination corresponding to the maximum number, obtains the common characteristics included in the common characteristic combination, and takes the multiple common characteristics as the new data characteristic. The new data characteristic is the characteristic corresponding to the sample data included in the new first-class sample set.

At S210, the server obtains a first-class label corresponding to the first-class sample sets, and generates a new data label of the first-class sample sets according to the first-class label.

Specifically, the server obtains the first-class sample in the first-class sample set, and obtains the first-class label corresponding to the first-class sample according to a preset corresponding relationship between the first-class sample and the first-class label. The first-class sample set includes multiple first-class samples. Different first-class samples correspond to different first-class labels. The server may respectively obtain the first-class labels corresponding to different first-class samples according to the corresponding relationship between the first-class sample and the first-class label, and generate the new data label according to the obtained first-class label. The new data label represents a label carried in the data newly added for the first-class sample set. The new data of the first-class sample set may be generated according to the new data label and the new data characteristic.

At S212, the server obtains the number of first-class sample sets and the number of second-class sample sets respectively, and calculates a ratio between the number of first-class sample sets and the number of second-class sample sets.

At S214, the server generates new data of the first-class sample sets according to the new data characteristic and the new data label, and adjusts the amount of new data according to the ratio to increase the number of first-class sample sets.

Specifically, the server obtains the number of first sample sets, that is, the number of sample points in the first sample set, obtains the number of second sample sets, that is, the number of sample points in the second sample set, calculates the ratio between the number of sample points in the first sample set and the number of sample points in the second sample set, and adjusts the amount of new data according to the ratio calculated, so as to increase the number of sample points in the first-class sample set and achieve a balanced state between the first-class sample set and the second-class sample set. The server generates the new data of the first-class sample set according to the new data characteristic and the new data label, that is, the new data is generated through the new data characteristic and the new data label.

When the number of sample points in the first sample set obtained by the server is 20, and the number of sample points in the second sample set obtained is 50, the ratio between the number of first-class sample sets and the number of second-class sample sets is 2:5 through calculation, and according to the obtained ratio, the amount of the new data is adjusted to generate 30 units of new data to achieve a balance between the first sample set and the second sample set. At the same time, the new data is generated through the new data characteristic and the new data label.

In the unbalanced sample data preprocessing method, the server classifies the initial data according to the preset classification rule to obtain the first-class sample set and the second-class sample set, extracts K first sample points and analyzes the characteristics thereof, generates the new data label of the first-class sample set according to the new data characteristic of the first-class sample set, calculates the ratio between the number of first-class sample sets and the number of second-class sample sets, generates the new data of the first-class sample set through the new data characteristic and the new data label, and adjusts the amount of the new data according to the ratio to increase the number of first-class sample sets, which may make the number of first-class sample sets and the number of second-class sample sets in a balanced state and solve the problem of sample imbalance.

Figure 3:
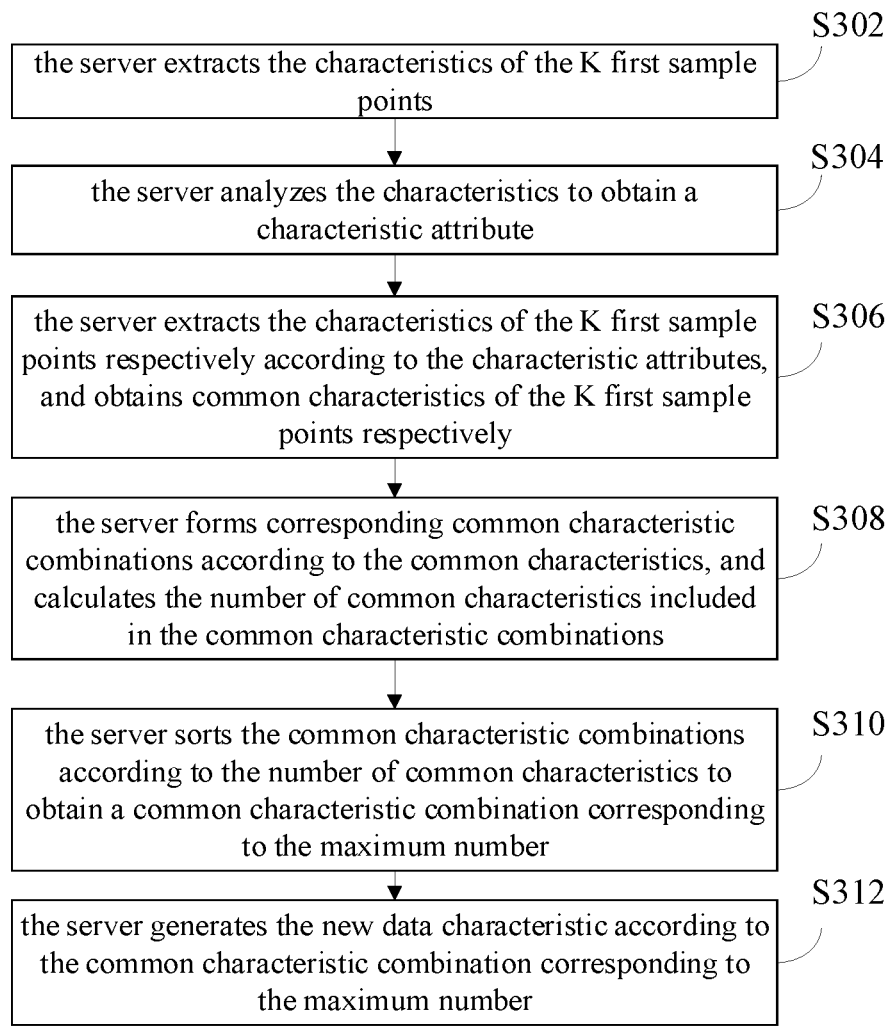
FIG. 3 is a flowchart of analyzing characteristics of K first sample points to obtain a new data characteristic according to one or more embodiments.

In one of the embodiments, as shown in FIG. 3, the following steps are provided to analyze the characteristics of K first sample points and obtain the new data characteristic.

At S302, the server extracts the characteristics of the K first sample points.

At S304, the server analyzes the characteristics to obtain a characteristic attribute.

Specifically, after extracting the characteristics of K first sample points to obtain the characteristics of the K first sample points, the server analyzes the characteristics to obtain the attributes of characteristic. The attributes of characteristic include the category of the characteristic and the definition of the characteristic. Taking any one of the K first sample points for example, the server extracts the characteristic of this first sample point, analyzes the characteristic and obtains the corresponding attributes of characteristic, including the categories to which the different characteristics belong and the respective definitions of the different characteristics.

At S306, the server extracts the characteristics of the K first sample points respectively according to the characteristic attributes, and obtains common characteristics of the K first sample points respectively.

Specifically, characteristic extraction refers to using a computer to extract image information to determine whether points of each image belong to an image characteristic. The server may obtain the common characteristic of each of the K first sample points through characteristic extraction. By determining the category of the characteristic, the different first sample points are classified according to the category of the characteristic. The server extracts the definition of different characteristics and obtains an intersection of the different characteristics according to the definition of characteristic, and extracts the intersection to obtain the common characteristics among the different characteristics.

At S308, the server forms corresponding common characteristic combinations according to the common characteristics, and calculates the number of common characteristics included in the common characteristic combinations.

At S310, the server sorts the common characteristic combinations according to the number of common characteristics to obtain a common characteristic combination corresponding to the maximum number.

Specifically, the server forms the corresponding common characteristic combination according to the obtained common characteristics. The number of common characteristics included in the different common characteristic combinations is calculated, and the common characteristic combinations are sorted according to the calculated number of common characteristics to obtain the common characteristic combination corresponding to the maximum number. For example, if the number of common characteristics included in the different common characteristic combinations is 2, 7, 4, 6 and 9, and the number of common characteristics obtained after sorting is 9, 7, 6, 4 and 2, then the obtained common characteristic combination corresponding to the maximum number is the common characteristic combination corresponding to the number of common characteristics 9.

At S312, the server generates the new data characteristic according to the common characteristic combination corresponding to the maximum number.

Specifically, the server obtains the calculated common characteristic combination corresponding to the maximum number, obtains the common characteristics included in the common characteristic combination, and takes the multiple common characteristics as the new data characteristic. The new data characteristic is the characteristic corresponding to the sample data included in the new first-class sample set.

In the step of analyzing the characteristics of K first sample points to obtain the new data characteristic, the server analyzes the characteristics of the K first sample points to obtain the characteristic attributes, and extracts the characteristics of the K first sample points respectively according to the characteristic attributes to obtain the common characteristics of the K first sample points respectively. Corresponding common characteristic combinations are formed according to the common characteristics, the number of common characteristics included in the common characteristic combinations is calculated, and the common characteristic combinations are sorted according to the number of common characteristics to obtain a common characteristic combination corresponding to the maximum number. By generating the new data characteristic according to the common characteristic combination corresponding to the maximum number, the generated new data characteristic may, to the greatest extent, include the characteristic corresponding to the first-class sample set, so as to ensure the similarity between the new data and the sample points in the first set.

In one of the embodiments, a step of receiving a data acquisition request and acquiring initial data according to the data acquisition request is provided, which includes:

the server acquires original data from a database according to a data acquisition request, obtains data type corresponding to the original data, obtains a preset corresponding relationship between the data type and a processing mode, and according to the processing mode, processes the original data corresponding to each data type to obtain the initial data.

Specifically, different original data corresponds to different data types. The data types include digital type, byte type and text type, and the corresponding original data includes digital original data, byte original data and text original data. The server may obtain the data type corresponding to the original data according to the preset corresponding relationship between the data type and the original data. Different data types correspond to different processing modes. The data types include digital type, byte type and text type, and the corresponding processing modes are judgment processing, assignment processing, and declaration processing.

Further, for the digital original data, judgment processing is performed, that is, a preset value range is obtained, the preset value range is compared with the value of the digital original data, it is determined whether the value of the digital original data conforms to the preset value range, and the digital original data conforming to the preset value range is extracted to generate the digital original data. For the byte original data, assignment processing is performed, that is, it is determined whether the value of the byte original data conforms to a preset value, and when the value of the byte original data does not conform to the preset value, the preset value is assigned to the corresponding byte original data, and byte initial data is generated according to the byte original data after assignment. For the text original data, declaration processing is performed, that is, a component of the text original data is obtained and compared with a preset component, and when the component of the text original data is inconsistent with the preset component, the text original data is declared as the preset component.

In the step of receiving the data acquisition request and acquiring the initial data according to the data acquisition request, by processing the original data according to the data type and generating the initial data targeted to different data types, the work efficiency is improved.

In one of the embodiments, a step of classifying the initial data according to the preset classification rule to obtain the first-class sample set and the second-class sample set is provided, which includes:

the server obtains the sample set corresponding to each data type according to the data type corresponding to the initial data, calculates the amount of the initial data of the sample set, compares the data amount of each sample set with the preset data amount threshold, and when the data amount exceeds the data amount threshold, obtains the second-class sample set according to the corresponding sample set, and when the data amount is lower than the data amount threshold, obtains the first-class sample set according to the corresponding sample set.

Specifically, the server obtains the data type corresponding to the initial data according to the preset corresponding relationship between the initial data and the data type, and obtains the sample set corresponding to each data type. The server calculates the data amount corresponding to the initial data of the sample set, and compares the data amount of each sample set with the preset data amount threshold to determine whether the data amount of each sample set exceeds the preset data amount threshold. When the data amount exceeds the data amount threshold, the sample set that the data amount exceeds the data amount threshold is the second-class sample set. When the data amount does not exceed the data amount threshold, the sample set that the data amount does not exceed the data amount threshold is the first-class sample set.

The data types include digital type, byte type and text type, and the corresponding sample sets are digital sample set, byte sample set and text sample set. The server may obtain the corresponding digital data type according to the digital initial data, and obtain the corresponding digital sample set. Similarly, the server may obtain the corresponding byte data type and the text data type respectively according to the byte initial data and the text initial data, and then obtain the corresponding byte sample set and text sample set.

Further, the number of data amount thresholds may be set to 100, and the data amounts of each sample set obtained are 80, 95, 108 and 120, so the sample sets with 80 and 95 data amounts are the first-class sample sets, while the sample sets with 108 and 120 data amounts are the second-class sample sets.

In the step of classifying the initial data according to the preset classification rule to obtain the first-class sample set and the second-class sample set, by classifying the sample sets in advance according to the data amount to obtain the first-class sample set and the second-class sample set, the sample set that needs the new data may be learned as soon as possible, the process of data addition is speeded up, and the work efficiency is improved.

In one of the embodiments, a step of extracting K first sample points in the first-class sample set is provided, which includes:

the server extracts a sample set from the first-class sample sets randomly to obtain the first sample set, respectively calculates the distances from all the first sample points in the first sample set to each sample point in the other sample sets of the first first-class sample sets, and sorts the first sample points according to the distances to obtain the first K first sample points.

Specifically, the first-class sample set includes multiple first-class samples, and the first-class sample includes multiple first sample points. The server extracts a sample set from the first-class sample sets randomly to obtain a first sample set. The distances from all the first sample points in the first sample set to each sample point in the other sample sets of the first first-class sample sets are calculated respectively, and the first sample points are sorted in the order of distances from small to large to obtain the first K first sample points.

In the step of extracting K first sample points in the first-class sample set, by calculating the distances from all the first sample points in the first sample set to each sample point in the other sample sets of the first first-class sample sets, and obtaining the first sample points corresponding to first K distances, the extracted first sample point is ensured to be the sample point with the smallest distance in the first K distances, and the accuracy of sample point extraction is improved.

In one of the embodiments, a step of extracting K first sample points in the first-class sample set is provided, which further includes:

the server respectively calculates the Euclidean distances from all the first sample points in the first sample set to each sample point in the first-class sample sets, sorts the Euclidean distances in order from small to large, and obtains the first sample points corresponding to the first K Euclidean distances according to the sorting of the Euclidean distances.

Specifically, the Euclidean distance represents the true distance between two points in a m-dimensional space, or the natural length of a vector, that is, the distance from that point to the origin. The server sorts the Euclidean distances calculated in order from small to large, and obtains the first sample points corresponding to the first K Euclidean distances, that is, the obtained first sample points are the sample points corresponding to the first K minimum Euclidean distances.

In the step of extracting K first sample points in the first-class sample set, the server respectively calculates the Euclidean distances from all the first sample points in the first sample set to each sample point in the first-class sample sets, and sorts the Euclidean distances in order from small to large. According to the sorting of Euclidean distances, the first sample points corresponding to the first K Euclidean distances are obtained, which further ensures that the extracted first sample points are the sample points with the lowest one of the first K Euclidean distances, and the accuracy of sample point extraction is improved.

It should be understood that although the steps in the flowcharts in FIG. 2 to FIG. 3 are shown in order as indicated by the arrows, they are not necessarily performed in the order indicated by the arrows. Unless explicitly stated in the application, there is no strict order in which these steps are performed, and they can be performed in any other order. Furthermore, at least a part of steps in FIG. 2 to FIG. 3 may include multiple sub-steps or multiple stages. These sub-steps or phases are not necessarily performed at the same time, but may be performed at different times. These substeps or stages are not necessarily performed in order, but may be performed in turn or alternately with at least a part of other steps or sub-steps or phases of the other steps.

Figure 4:
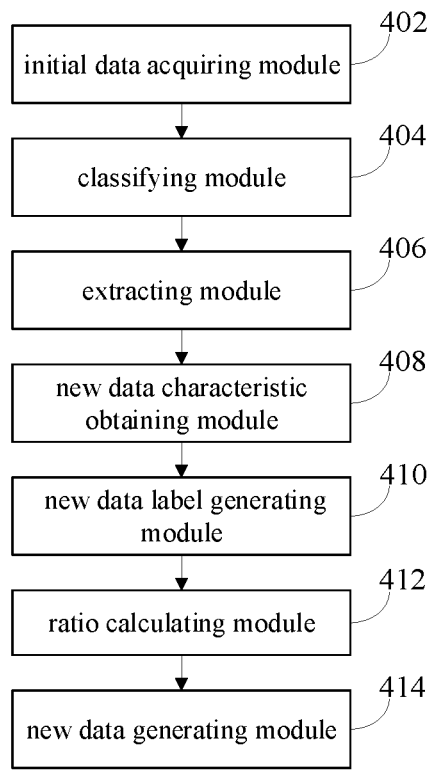
FIG. 4 is a block diagram of an unbalanced sample data preprocessing device according to one or more embodiments.

In one of the embodiments, as shown in FIG. 4, an unbalanced sample data preprocessing device is provided, which includes: an initial data acquiring module 402, a classifying module 404, an extracting module 406, a new data characteristic obtaining module 408, a new data label generating module 410, a ratio calculating module 412, and a new data generating module 414.

The initial data acquiring module 402 is configured to receive the data acquisition request, and acquire the initial data according to the data acquisition request.

The classifying module 404 is configured to classify the initial data according to the preset classification rule to obtain the first-class sample set and the second-class sample set. The number of samples in each of the first-class sample sets is less than the data amount threshold, and the number of samples in each of the second-class sample sets is greater than the data amount threshold.

The extracting module 406 is configured to extract K first sample points in the first-class sample sets.

The new data characteristic obtaining module 408 is configured to analyze the characteristics of the K first sample points to obtain the new data characteristic of the first-class sample sets.

The new data label generating module 410 is configured to obtain the first-class label corresponding to the first-class sample sets, and generate the new data label of the first-class sample sets according to the first-class label.

The ratio calculating module 412 is configured to respectively obtain the number of first-class sample sets and the number of second-class sample sets, and calculate a ratio between the number of first-class sample sets and the number of second-class sample sets.

The new data generating module 414 is configure to generate the new data of the first-class sample sets according to the new data characteristic and the new data label, and adjust the amount of new data according to the ratio to increase the number of first-class sample sets.

With the unbalanced sample data preprocessing device, the server classifies the initial data according to the preset classification rule to obtain the first-class sample set and the second-class sample set, extracts K first sample points and analyzes the characteristics thereof, generates the new data label of the first-class sample set according to the new data characteristic of the first-class sample set, calculates the ratio between the number of first-class sample sets and the number of second-class sample sets, generates the new data of the first-class sample set through the new data characteristic and the new data label, and adjusts the amount of the new data according to the ratio to increase the number of first-class sample sets, which may make the number of first-class sample sets and the number of second-class sample sets in a balanced state and solve the problem of sample imbalance.

In one of the embodiments, an initial data acquiring module is provided, which is further configured to: acquire the original data from the database according to the data acquisition request; obtain the data type corresponding to the original data; obtain the preset corresponding relationship between the data type and the processing mode; and according to the processing mode, process the original data corresponding to each data type to obtain the initial data.

With the initial data acquiring module, by processing the original data according to the data type and generating the initial data targeted to different data types, the work efficiency is improved.

In one of the embodiments, a classifying module is provided, which is further configured to: obtain the sample set corresponding to each data type according to the data type corresponding to the initial data; calculate the amount of the initial data of the sample set; compare the data amount of each sample set with the preset data amount threshold; when the data amount exceeds the data amount threshold, obtain the second-class sample set according to the corresponding sample set; and when the data amount is lower than the data amount threshold, obtain the first-class sample set according to the corresponding sample set.

With the classifying module, by classifying the sample sets in advance according to the data amount to obtain the first-class sample set and the second-class sample set, the sample set that needs the new data may be learned as soon as possible, the process of data addition is speeded up, and the work efficiency is improved.

In one of the embodiments, an extracting module is provided, which is further configured to: extract a sample set from the first-class sample sets randomly to obtain the first sample set; respectively calculate the distances from all the first sample points in the first sample set to each sample point in the other sample sets of the first first-class sample sets; and sort the first sample points according to the distances to obtain the first K first sample points.

With the extracting module, by calculating the distances from all the first sample points in the first sample set to each sample point in the other sample sets of the first first-class sample sets, and obtaining the first sample points corresponding to first K distances, the extracted first sample point is ensured to be the sample point with the smallest distance in the first K distances, and the accuracy of sample point extraction is improved.

In one of the embodiments, an extracting module is provided, which is further configured to: respectively calculate the Euclidean distances from all the first sample points in the first sample set to each sample point in the first-class sample sets; sort the Euclidean distances in order from small to large; and obtain the first sample points corresponding to the first K Euclidean distances according to the ordering of the Euclidean distances.

With the extracting module, the server respectively calculates the Euclidean distances from all the first sample points in the first sample set to each sample point in the first-class sample sets, and sorts the Euclidean distances in order from small to large. According to the sorting of Euclidean distances, the first sample points corresponding to the first K Euclidean distances are obtained, which further ensures that the extracted first sample points are the sample points with the lowest one of the first K Euclidean distances, and the accuracy of sample point extraction is improved.

In one of the embodiments, a new data generating module is provided, which is further configured to: extract the characteristics of K first sample points; analyze the characteristics to obtain the characteristic attributes; respectively extract the characteristics of the K first sample points according to the characteristic attributes to respectively obtain the common characteristics of the K first sample points; form the common characteristic combinations according to the common characteristics and calculate the number of common characteristics included in the common characteristic combinations; sort the common characteristic combinations according to the number of common characteristics to obtain a common characteristic combination corresponding to the maximum number; and generate the new data characteristic according to the common characteristic combination corresponding to the maximum number.

With the new data generating module, the server analyzes the characteristics of the K first sample points to obtain the characteristic attributes, and extracts the characteristics of the K first sample points respectively according to the characteristic attributes to obtain the common characteristics of the K first sample points respectively. The corresponding common characteristic combinations are formed according to the common characteristics, the number of common characteristics included in the common characteristic combinations is calculated, and the common characteristic combinations are sorted according to the number of common characteristics to obtain a common characteristic combination corresponding to the maximum number. By generating the new data characteristic according to the common characteristic combination corresponding to the maximum number, the generated new data characteristic may, to the greatest extent, include the characteristic corresponding to the first-class sample set, so as to ensure the similarity between the new data and the sample points in the first set.

For the specific limitations of the unbalanced sample data preprocessing device, the above limitations of the unbalanced sample data preprocessing method may be referred to, which will not be repeated here. Each module in the unbalanced sample data preprocessing device may be realized in whole or in part by software, hardware and their combination. Each above module may be embedded in or independent of a processor in a computer device in the form of hardware, or stored in a memory in the computer device in the form of software, so that the processor may call and perform the operation corresponding to each module above.

In one of the embodiments, a computer device is provided. The computer device may be a server, and its internal structure may be shown in FIG. 5. The computer device includes a processor, a memory, a network interface and a database connected through a system bus. The processor of the computer device is used to provide computing and control capabilities. The memory of the computer device includes a non-transitory computer readable storage medium and an internal memory. The non-transitory computer readable storage medium stores an operating system, a computer readable instruction and a database. The internal memory provides an environment for the operation of the operating system and the computer readable instruction in the non-transitory computer readable storage medium. The database of the computer device is used to store unbalanced sample data. The network interface of the computer device is used to communicate with an external terminal through a network connection. The computer readable instruction, when executed by the processor, performs an unbalanced sample data preprocessing method.

Figure 5:
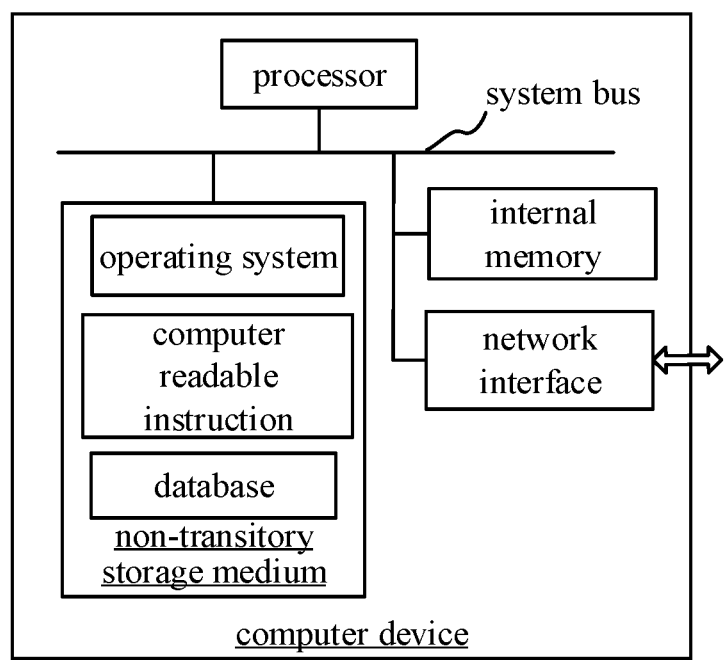
FIG. 5 is a block diagram of a computer device according to one or more embodiments.

Those of ordinary skill in the art may understand that the structure shown in FIG. 5 is only a block diagram of part of the structure related to the solutions of the application and does not constitute a limitation on the computer device applied to the solutions of the application. Specifically, the computer device may include more or fewer parts than that are shown in the figures, or some combination of parts, or a different arrangement of parts. A computer device includes a memory and one or more processors. The memory stores a computer readable instruction. The computer readable instruction, when executed by the processor, performs the steps of the unbalanced sample data preprocessing method provided in any embodiment of the application.

One or more non-transitory computer readable storage media storing a computer readable instruction are provided. The computer readable instruction, when executed by one or more processors, causes the one or more processors to perform the steps of the unbalanced sample data preprocessing method provided in any embodiment of the application.

Those of ordinary skill in the art may understand that all or a part of flows of the method in the above embodiments may be completed by related hardware instructed by a computer readable instruction. The computer readable instruction may be stored in a non-transitory computer readable storage medium. When executed, the computer readable instruction may include the flows in the embodiments of the method. Any reference to memory, storage, database or other media used in each embodiment provided in the application may include non-transitory and/or transitory memories. The non-transitory memories may include a Read-Only Memory (ROM), a Programmable Read-Only Memory (PROM), an Electrically Programmable Read-Only Memory (EPROM), an Electrically Erasable Programmable Read-Only Memory (EEPROM) or a flash memory. The transitory memories may include a Random Access Memory (RAM) or an external cache memory. As an illustration rather than a limitation, the RAM is available in many forms, such as Static RAM (SRAM), Dynamic RAM (DRAM), Synchronous DRAM (SDRAM), Double Data Rate SDRAM (DDRAM), Enhanced SDRAM (ESDRAM), Synch-link DRAM (SLDRAM), Rambus Direct RAM (RDRAM), Direct Memory Bus Dynamic RAM (DRDRAM), and Memory Bus Dynamic RAM (RDRAM).

The technical characteristics of the above embodiments may be combined at random. To make the description concise, not all possible combinations of these technical characteristics of the above embodiments are described, however, all the combinations of these technical characteristics shall fall within the scope of the description, as long as there is no contradiction in the combinations of these technical characteristics.

The above embodiments only express several implementation modes of the application. The descriptions of these embodiments are specific and detailed, however, they cannot be understood as a limitation to the claimed scope of the disclosure. It should be pointed out that those of ordinary skill in the art may also make several improvements and modifications without departing from the conception of the application, and these improvements and modifications should fall within the protection scope of protection of the application. Therefore, the protection scope of the application is subject to the attached claims.

What is claimed is:

1. An unbalanced sample data preprocessing method, comprising:
    receiving a data acquisition request, and acquiring initial data according to the data acquisition request;
    classifying the initial data according to a preset classification rule to obtain first-class sample sets and second-class sample sets, wherein a number of samples in each of the first-class sample sets is less than a data amount threshold, and wherein a number of samples in each of the second-class sample sets is greater than the data amount threshold;
    extracting K first sample points in the first-class sample sets, wherein K is an integer greater than 1;
    analyzing characteristics of the K first sample points to obtain a new data characteristic of the first-class sample sets;

obtaining a first-class label corresponding to the first-class sample sets, and generating a new data label of the first-class sample sets according to the first-class label;

respectively obtaining a number of first-class sample sets and a number of second-class sample sets, and calculating a ratio between the number of first-class sample sets and the number of second-class sample sets; and generating new data of the first-class sample sets according to the new data characteristic and the new data label, and adjusting an amount of new data according to the ratio to increase the number of first-class sample sets,.

wherein analyzing the characteristics of the K first sample points to obtain the new data characteristic comprises:

extracting the characteristics of the K first sample points;

analyzing the characteristics to obtain a characteristic attribute;

respectively extracting the characteristics of the K first sample points according to the characteristic attribute, and respectively obtaining common characteristics of the K first sample points;

forming corresponding common characteristic combinations according to the common characteristics, and calculating a number of common characteristics comprised in the common characteristic combinations;

sorting the common characteristic combinations according to the number of common characteristics to obtain a common characteristic combination corresponding to a maximum number; and generating the new data characteristic according to the common characteristic combination corresponding to the maximum number.

2. The method as claimed in claim 1, wherein receiving the data acquisition request, and acquiring the initial data according to the data acquisition request comprises:

acquiring original data from a database according to the data acquisition request;

obtaining data types corresponding to the original data;

obtaining a preset corresponding relationship between a data type and a processing mode; and processing original data corresponding to each data type according to the processing mode to obtain the initial data.

3. The method as claimed in claim 2, wherein classifying the initial data according to the preset classification rule to obtain the first-class sample sets and second-class sample sets comprises:

obtaining a sample set corresponding to each data type according to the data types corresponding to the initial data;

calculating a data amount of the initial data of the sample set;

comparing the data amount of each sample set with a preset data amount threshold;

when the data amount exceeds the preset data amount threshold, obtaining the second-class sample sets according to the corresponding sample set; and when the data amount is lower than the preset data amount threshold, obtaining the first-class sample sets according to the corresponding sample set.

4. The method as claimed in claim 1, wherein extracting the K first sample points in the first-class sample sets comprises:

extracting a sample set from the first-class sample sets randomly to obtain a first sample set;

respectively calculating distances from all first sample points in the first sample set to each sample point in other sample sets of the first first-class sample sets; and sorting first sample points according to the distances to obtain the first K first sample points.

5. The method as claimed in claim 4, further comprising:

respectively calculating Euclidean distances from all the first sample points in the first sample set to each sample point in the first-class sample sets; and sorting the Euclidean distances in order from small to large; and obtaining first sample points corresponding to the first K Euclidean distances according to the sorting of the Euclidean distances.

6. A computer device, comprising:

a memory and one or more processors, wherein the memory stores a computer readable instruction, and wherein the computer readable instruction, when executed by one or more processors, causes the one or more processors to perform:

receiving a data acquisition request, and acquiring initial data according to the data acquisition request;

classifying the initial data according to a preset classification rule to obtain first-class sample sets and second-class sample sets, wherein a number of samples in each of the first-class sample sets is less than a data amount threshold, and wherein a number of samples in each of the second-class sample sets is greater than the data amount threshold;

extracting K first sample points in the first-class sample sets, wherein K is an integer greater than 1;

analyzing characteristics of the K first sample points to obtain a new data characteristic of the first-class sample sets;

obtaining a first-class label corresponding to the first-class sample sets, and generating a new data label of the first-class sample sets according to the first-class label;

respectively obtaining a number of first-class sample sets and the number of second-class sample sets, and calculating a ratio between the number of first-class sample sets and the number of second-class sample sets; and generating new data of the first-class sample sets according to the new data characteristic and the new data label, and adjusting an amount of new data according to the ratio to increase the number of first-class sample sets, wherein to perform analyzing the characteristics of the K first sample points to obtain the new data characteristic, the one or more processors, when executing the computer readable instruction, are configured to perform:

extracting the characteristics of the K first sample points;

analyzing the characteristics to obtain a characteristic attribute;

respectively extracting the characteristics of the K first sample points according to the characteristic attribute, and respectively obtaining common characteristics of the K first sample points;

forming corresponding common characteristic combinations according to the common characteristics, and calculating a number of common characteristics comprised in the common characteristic combinations;

sorting the common characteristic combinations according to the number of common characteristics to obtain a common characteristic combination corresponding to a maximum number; and
generating the new data characteristic according to the common characteristic combination corresponding to the maximum number.

7. The computer device as claimed in claim 6, wherein to perform receiving the data acquisition request and acquiring the initial data according to the data acquisition request, the one or more processors, when executing the computer readable instruction, are configured to perform:
acquiring original data from a database according to the data acquisition request;
obtaining data types corresponding to the original data;
obtaining a preset corresponding relationship between a data type and a processing mode; and
processing original data corresponding to each data type according to the processing mode to obtain the initial data.

8. The computer device as claimed in claim 7, wherein to perform classifying the initial data according to the preset classification rule to obtain the first-class sample sets and second-class sample sets, the one or more processors, when executing the computer readable instruction, are configured to perform:
obtaining a sample set corresponding to each data type according to the data types corresponding to the initial data;
calculating a data amount of the initial data of the sample set;
comparing the data amount of each sample set with a preset data amount threshold;
when the data amount exceeds the preset data amount threshold, obtaining the second-class sample sets according to the corresponding sample set; and
when the data amount is lower than the preset data amount threshold, obtaining the first-class sample sets according to the corresponding sample set.

9. The computer device as claimed in claim 6, wherein to perform extracting the K first sample points in the first-class sample sets, the one or more processors, when executing the computer readable instruction, are configured to perform:
extracting a sample set from the first-class sample sets randomly to obtain a first sample set;
respectively calculating distances from all first sample points in the first sample set to each sample point in other sample sets of the first first-class sample sets; and
sorting first sample points according to the distances to obtain the first K first sample points.

10. The computer device as claimed in claim 9, wherein the one or more processors, when executing the computer readable instruction, are further configured to perform:
respectively calculating Euclidean distances from all the first sample points in the first sample set to each sample point in the first-class sample sets; and
sorting the Euclidean distances in order from small to large; and
obtaining first sample points corresponding to the first K Euclidean distances according to the sorting of the Euclidean distances.

11. A non-transitory computer readable storage medium storing a computer readable instruction, wherein the computer readable instruction, when executed by one or more processors, causes the one or more processors to perform:
receiving a data acquisition request, and acquiring initial data according to the data acquisition request;
classifying the initial data according to a preset classification rule to obtain first-class sample sets and second-class sample sets, wherein a number of samples in each of the first-class sample sets is less than a data amount threshold, and wherein a number of samples in each of the second-class sample sets is greater than the data amount threshold;
extracting K first sample points in the first-class sample sets, wherein K is an integer greater than 1;
analyzing characteristics of the K first sample points to obtain a new data characteristic of the first-class sample sets;
obtaining a first-class label corresponding to the first-class sample sets, and generating a new data label of the first-class sample sets according to the first-class label;
respectively obtaining a number of first-class sample sets and the number of second-class sample sets, and calculating a ratio between the number of first-class sample sets and the number of second-class sample sets; and
generating new data of the first-class sample sets according to the new data characteristic and the new data label, and adjusting an amount of new data according to the ratio to increase the number of first-class sample sets,
wherein to perform analyzing the characteristics of the K first sample points to obtain the new data characteristic, the computer readable instruction, when executed by the one or more processors, causes the one or more processors to perform:
extracting the characteristics of the K first sample points;
analyzing the characteristics to obtain a characteristic attribute;
respectively extracting the characteristics of the K first sample points according to the characteristic attribute, and respectively obtaining common characteristics of the K first sample points;
forming corresponding common characteristic combinations according to the common characteristics, and calculating a number of common characteristics comprised in the common characteristic combinations;
sorting the common characteristic combinations according to the number of common characteristics to obtain a common characteristic combination corresponding to a maximum number; and
generating the new data characteristic according to the common characteristic combination corresponding to the maximum number.

12. The storage medium as claimed in claim 11, wherein to perform receiving the data acquisition request and acquiring the initial data according to the data acquisition request, the computer readable instruction, when executed by the one or more processors, causes the one or more processors to perform:
acquiring original data from a database according to the data acquisition request;
obtaining data types corresponding to the original data;
obtaining a preset corresponding relationship between a data type and a processing mode; and
processing original data corresponding to each data type according to the processing mode to obtain the initial data.

13. The storage medium as claimed in claim 12, wherein to perform classifying the initial data according to the preset classification rule to obtain the first-class sample sets and second-class sample sets, the computer readable instruction, when executed by the one or more processors, causes the one or more processors to perform:

obtaining a sample set corresponding to each data type according to the data types corresponding to the initial data;

calculating a data amount of the initial data of the sample set;

comparing the data amount of each sample set with a preset data amount threshold;

when the data amount exceeds the preset data amount threshold, obtaining the second-class sample sets according to the corresponding sample set; and when the data amount is lower than the preset data amount threshold, obtaining the first-class sample sets according to the corresponding sample set.

14. The storage medium as claimed in claim 11, wherein to perform extracting the K first sample points in the first-class sample sets, the computer readable instruction, when executed by the one or more processors, causes the one or more processors to perform:

extracting a sample set from the first-class sample sets randomly to obtain a first sample set;

respectively calculating distances from all first sample points in the first sample set to each sample point in other sample sets of the first first-class sample sets; and sorting first sample points according to the distances to obtain the first K first sample points.

15. The storage medium as claimed in claim 14, wherein the computer readable instruction, when executed by the one or more processors, causes the one or more processors to perform:

respectively calculating Euclidean distances from all the first sample points in the first sample set to each sample point in the first-class sample sets; and sorting the Euclidean distances in order from small to large; and obtaining the first sample points corresponding to the first K Euclidean distances according to the sorting of the Euclidean distances.

* * * * *